June 10, 1952     Y. E. MERODIAN     2,600,067
CUTTING DEVICE
Filed Jan. 13, 1950

INVENTOR
Yervant E. Merodian
BY Harold E. Cole
Attorney

Patented June 10, 1952

2,600,067

UNITED STATES PATENT OFFICE 2,600,067

CUTTING DEVICE

Yervant E. Merodian, Boston, Mass.

Application January 13, 1950, Serial No. 138,414

2 Claims. (Cl. 30—314)

This invention relates to a cutting device having a heat retaining head and a blade adapted to be heated.

The principal object of my invention is to provide a cutting device that will cut fabric, especially fabric impregnated with a plastic, leaving a perfectly smooth outside edge.

Another object is to provide such a device that is simple and inexpensive to manufacture with the cutting blade and the shank so positioned that cutting of the fabric can easily and accurately be performed.

The foregoing and other objects which will appear as the nature of the invention is better understood, may be accomplished by a construction and arrangement such as is disclosed by the drawings. The nature of the invention is such as to render it susceptible to various changes and modifications, and, therefore, I am not to be limited to the construction disclosed by the drawings nor to the particulars described in the specification; but am entitled to all such changes therefrom as fall within the scope of my claims.

Figure 1:
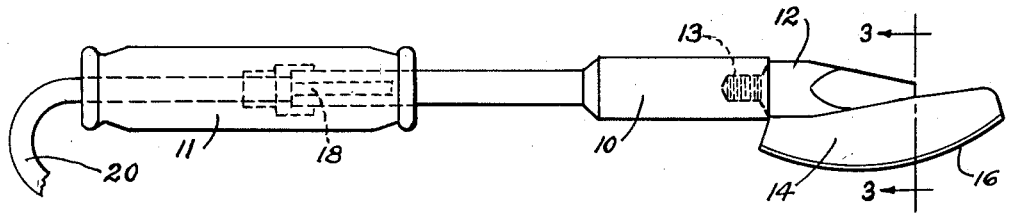
Figure 1 is a side elevational view of my cutting device.
Figure 2:
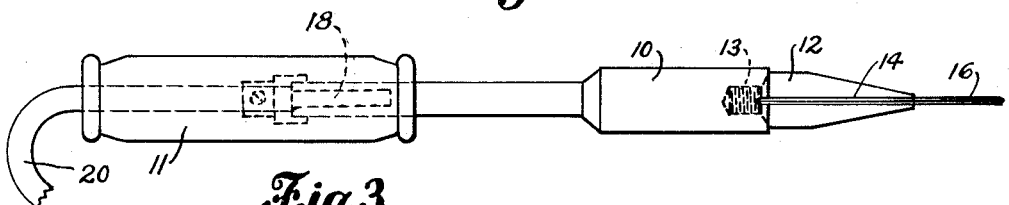
Figure 2 is a bottom plan view thereof.
Figure 3:
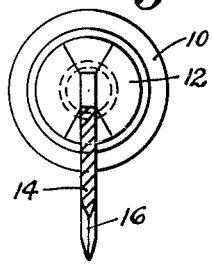
Figure 3 is a sectional view taken on the line 3—3 of said Figure 1.

As illustrated, my device has a shank 10 embodying a handle 11 at one end, and a heat retaining head 12 at the other end that has a threaded portion 13 which screw threadedly connects with said shank 10. A portion of this head 12 extends at an angle to the longitudinal axis of said shank 10 and it carries a blade 14 which is, in position of use, lower than said shank 10 and, therefore, out of alinement with it, although extending in the same general direction. Said blade 14 has a cutting edge 16 that extends in a plane coinciding with said shank's longitudinal axis, said blade extending alongside said head 12. In any form it extends in the same general direction as said axis. This cutting edge also may extend beyond and forwardly of said head 12 and also slightly rearward thereof as shown in said Figures 1 and 2.

While said head 12 may be heated by an exterior heat source such as a gas flame or charcoal fire, where electricity is available, I provide a well known electrical heating element 18 retained by said shank 10 to which an electrical cord 20 is attached. In this construction the electrical current heats the said head 12 through which heat is transferred to said blade 14.

Said blade 14 may be formed as an integral part of said head 12 or it may be formed separately and welded or attached to said head.

Figure 4:
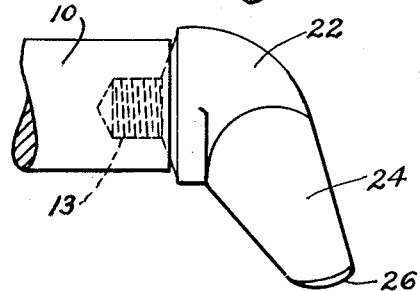
Figure 4 is a side elevational view, broken away, of a modified form of my cutting device.

In Figure 4 of the drawings I show a modified form of my device in which a heat retaining head 22 and a blade 24 are unitary. The blade extends diagonally downward and forward, tapering in width and terminating in a cutting edge 26 well below and extending in the same general direction as said shank 11 in position of use.

In all forms of my cutting device, the heat retaining head serves to store heat and transmit it by conduction to the blade, which latter is of reduced width compared to said head.

In use, when the blade 16 or 24 has been sufficiently heated, it is drawn along the fabric as though it were a simple knife, cutting, and simultaneously sealing the severed edges of the fabric by the heat. It is especially effective in cutting such materials as lumite, glass fabric and fabrics impregnated with plastic or wax, since they contain material that can be sealed by the heat in the blade 14 as it cuts.

What I claim is:

1. A cutting device comprising a shank, a head tapering in thickness towards its front and attached to said shank and adapted to be heated, and a cutting blade carried by and extending alongside said head and embodying a cutting edge, said cutting blade and edge extending in part alongside and in part beyond said head.

2. A cutting device comprising a shank, a head attached to said shank and adapted to be heated, and a cutting blade carried by and extending alongside said head and embodying an arcuate cutting edge, said cutting blade and edge extending in part alongside and in part beyond said head, an intermediate portion of said blade being of greater width than opposite end portions thereof.

YERVANT E. MERODIAN.

REFERENCES CITED

The following references are of record in the file of this patent:

UNITED STATES PATENTS

| Number | Name | Date |
|---|---|---|
| 1,033,485 | Steel | July 23, 1912 |
| 1,053,005 | Brown | Feb. 11, 1913 |
| 1,429,880 | Hoffmann | Sept. 19, 1922 |
| 1,825,077 | Lawrence | Sept. 29, 1931 |